United States Patent [11] 3,612,924

| [72] | Inventor | Adelbert Semmelink<br>Riverside, Ill. |
|------|----------|------------------------------------|
| [21] | Appl. No.| 861,376 |
| [22] | Filed    | Sept. 26, 1969 |
| [45] | Patented | Oct. 12, 1971 |
| [73] | Assignee | Continental Can Company, Inc.<br>New York, N.Y. |

[54] MASS LOADED MAGNETOSTRICTIVE TRANSDUCER
3 Claims, 4 Drawing Figs.

| [52] | U.S. Cl. | 310/26, 340/11 |
|------|----------|----------------|
| [51] | Int. Cl. | H01v 9/00 |
| [50] | Field of Search | 310/26; 318/118; 340/8-12 |

[56] References Cited
UNITED STATES PATENTS

| 2,116,522 | 5/1938  | Kunze       | 318/118 X |
| 2,842,689 | 7/1958  | Harris      | 310/26    |
| 3,161,792 | 12/1964 | Wright      | 310/26    |
| 2,947,890 | 8/1960  | Harris et al.| 310/26   |
| 2,955,217 | 10/1960 | Harris      | 310/26    |
| 3,009,131 | 11/1961 | Woodworth   | 340/11 X  |
| 3,109,973 | 11/1963 | Harris      | 318/118   |

Primary Examiner—D. F. Duggan
Attorneys—Americus Mitchell, Joseph E. Kerwin and William A. Dittmann ABSTRACT: This device is a magnetostrictive transducer having several magnetostrictive elements spaced one from the other and having two end bodies, one mounted at each end of the magnetostrictive elements and attached to each magnetostrictive element so as to be moved by the contraction and expansion of the magnetostrictive elements. The mass of the end bodies is large compared to that of the magnetostrictive elements. A series of coils are wound around the magnetostrictive elements in such a way that when pulsating current is conducted through the coils, the magnetostrictive elements contract and expand in accordance with the strength of the pulsating current and move the end bodies. The magnetostrictive elements and end bodies resonate at a predetermined frequency and the pulsating current actuates the transducer at the frequency to give a greater power and efficiency to the transducer output.

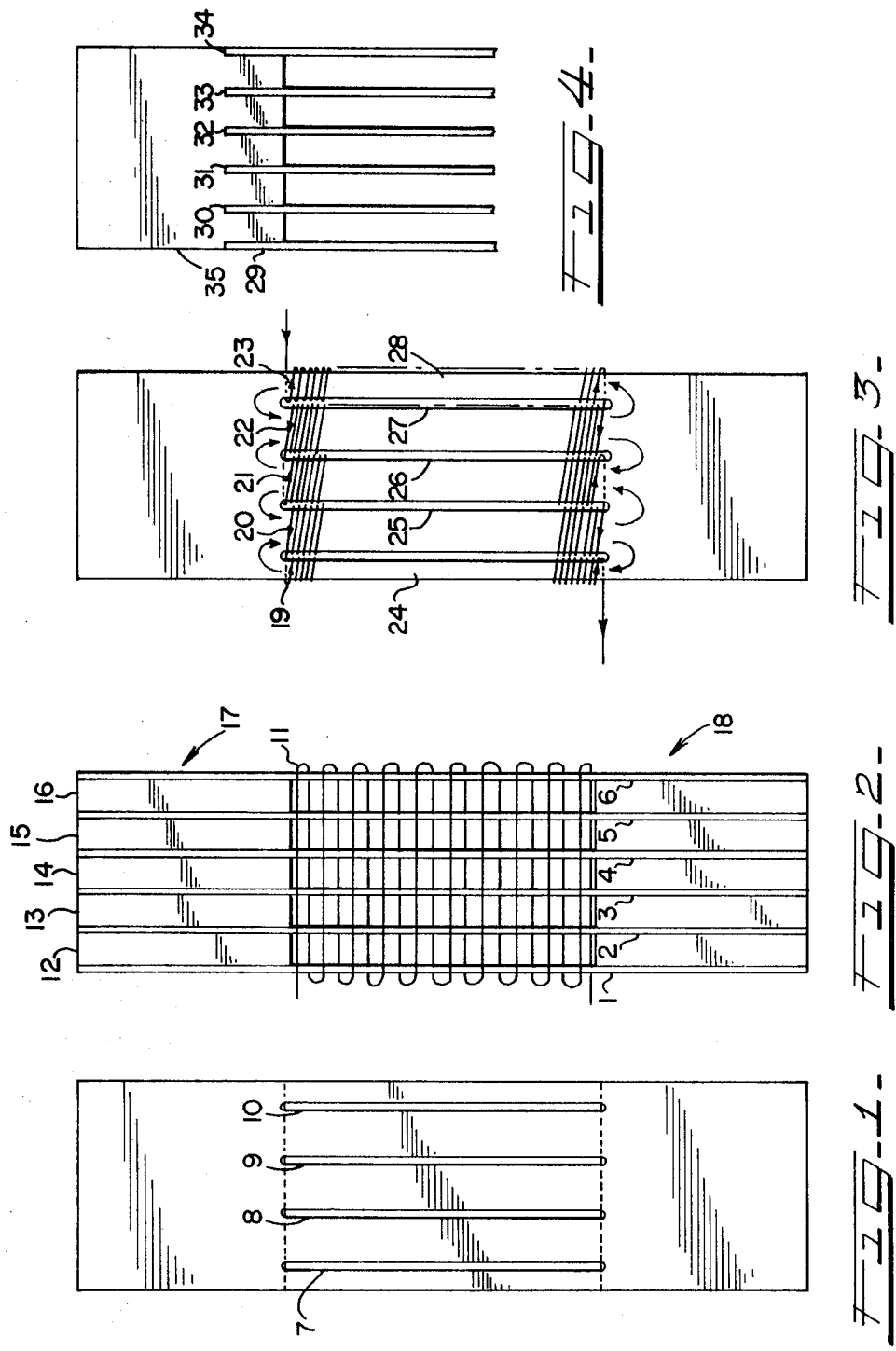

MASS LOADED MAGNETOSTRICTIVE TRANSDUCER

My invention relates to transducers of the type comprising magnetostrictive material, and particularly to the type having spaced magnetostrictive material with a mass load at each end of the spaced magnetostrictive material.

Magnetostrictive transducers, such as the present one, have the property that when the magnetostrictive elements are subjected to an applied magnetic field, the physical dimensions change. The stiffness of the active element is proportional to its cross-sectional area and can therefore be made smaller by reducing this area. A convenient method for reducing the cross-sectional area is by spacing the laminations in the active element. A nickel transducer operating at half wavelength resonance at a frequency of 20 kHz. would have a length of 12.5 cm. approximately. At that frequency, the maximum amplitude of vibration is small and of the order of a few hundred microinches. The maximum amplitude of vibration of a half wavelength transducer is inversely proportional to the frequency, and therefore, can be increased by decreasing the frequency. For a half wavelength transducer, this means increasing the length which is also inversely proportional to the frequency. A long and unwieldy transducer is produced at a frequency of 1 kHz.

It is a general object of this invention to provide improved transducers with a large amplitude displacement.

It is another object of my invention to provide an improved magnetostrictive transducer of smaller size than for a half wavelength transducer.

It is another object of my invention to provide a transducer with improved operating efficiency.

It is a final object of my invention to provide a low-frequency magnetostrictive transducer.

In brief, my mass-loaded transducer is a composite in which two end bodies are driven by a central active element. The mass of the active element is small compared to the mass of the end bodies. This is achieved by making the cross-sectional area of the active element much smaller than that of the end bodies by spacing the magnetostrictive laminations or using a number of bars. The result is that the strain in the active element is substantially uniform, and the vibrational strain in the end masses is small.

A pulsating current is conducted through coils wrapped about each leg or bar.

Other objects and advantages of my invention will become apparent by reference to the following detailed description taken in connection with the accompanying drawings in which:

FIG. 1 is a front view of the frame of my transducer.

FIG. 2 is a side view of my transducer frame.

FIG. 3 is a front view of my transducer showing the coil winding.

FIG. 4 is a side view of an alternate embodiment of my apparatus.

The problem of cumbersome length at low frequency may be solved by loading the ends of a transducer of a given length. Fastening masses to the ends of the transducer lowers the transducer frequency. In a mass-loaded transducer, the length may be made considerably shorter without reducing the maximum amplitude of vibration materially. The maximum amplitude of vibration is related directly to the maximum allowable strain of the transducer material.

My invention shown in the Figures above contemplates using spaced magnetostrictive elongate material and coils of conductive material are wound around the active material. Pulsating electric current is conducted through the coils. To reduce the resonance frequency of the entire system, the ends of the active material are each loaded with a body or mass. The relative proportions of the active material and mass may be varied according to the frequency desired for the transducer. The pulsating current frequency which is applied to the coils passing around the active material is of such frequency as to reinforce the vibrations at the resonant frequency of the transducer system.

A plurality of elongated flat members 1–6 of active material having slots 7–10 through the flat side of each member is shown in FIGS. 1 and 2. The slots are shown and located longitudinally in the active material to allow space for electric coil windings 11 to be wound through the slots in such a way that when current is sent through the windings, magnetic fields are set up in the active material to cause the active material to expand or contract, depending upon whether its coefficient of expansion is positive or negative.

My mass-loaded magnetostrictive transducer is shown with greater clarity in FIG. 2. Each of the active material sheets 1–6 is shown as having spacers 12–16 located between them. The spacers are fastened to the magnetostrictive elements by pins or suitable adhesives. The spacers taken together constitute the mass of the end pieces 17,18 which load the transducer. The outline of the spacers is shown in FIG. 1 by the dotted lines above and below the slots. Each of the coils 19–23 extend around one of the legs 24–28 of the transducer.

The resonance frequency of a mass-loaded transducer is proportional to the square root of the ratio of the stiffness of the mechanical or active element to the effective mass of the two end bodies.

Spaced lamination transducers have been used to match the acoustic impedance of the transducer to that of a liquid. This increases the efficiency of operation. In the mass-loaded transducer described here, spacing of the laminations is used to reduce the stiffness of the active element. By reducing the stiffness to a value much smaller than that of the end pieces, we arrive at the concept of a mass-loaded transducer. However, the idea of the interleaved end pieces of FIGS. 1, 2 or 3 is more efficient and does not put undue strain on the connection between end piece and active element. The magnetic field through the active material is nearly uniform and the strain on the material between the end pieces is nearly uniform throughout the active material. For a given resonance frequency, the length of a loaded transducer is considerably less than for an unloaded transducer.

A transducer resonating at high frequency does not have very much displacement amplitude. For certain applications, large displacement amplitudes may be most useful and lower frequencies are desired.

In order to minimize flux losses, one or more slots are made in each of the strips. A conductive wire (FIG. 3) is wound through the slots and around each leg 24–28 to form separate coils. The coils are wound in opposite directions on adjacent legs so that the magnetic fields in adjacent legs between the slots are opposed to form a closed magnetic field. The voltage per turn on the two outer legs 24,28 is half the voltage per turn on the inner legs 25,26,27. The magnetic field in each leg is the same strength. All turns are shown connected in series. Each leg of this embodiment has six elongate magnetostrictive elements mounted one in front of the other.

When a parallel connection is desired, the windings on the two outer legs are connected in series and this combination is connected in parallel with the windings on the three inner legs. However, parallel connections would lead to low and inconvenient impedance values.

The current which is conducted through the coils around the legs is an AC current on a DC component. The DC component is always greater than the AC component. This is to avoid current reversal through the coils around the legs with resulting distortion of the wave formed and the generated strain in the transducer.

Suitable materials for end body construction are steel, tungsten or brass to give concentrated weight to the end masses. These materials must be rigid.

The part of the magnetostrictive material in the end pieces has a large cross section in comparison to the cross section of each leg. In this way, the flux density is much lower in the end pieces than in the legs, and the magnetostrictive strain is correspondingly lower. The spacing material is preferably nonmagnetic. Materials which have adequate mechanical and magnetostrictive characteristics for the active material in all around use are nickel or 2V-permendur A preferred magnetostrictive material for my mass loaded magnetostrictive transducer is 2V-permendur because of its high-magnetostrictive constant and high-electrical resistivity.

The laminations could be held together by epoxy resin, by bolting, or riveting, if desired.

An alternate possibility for mass loading magnetostrictive transducers is shown in FIG. 4 where the laminations are inserted into slots 29-34 which are milled in solid end pieces of heavy material. Only one piece 35 is shown. An advantage to this arrangement is that less magnetostrictive material is required. However, the economy is to some extent offset by increased machining time for the end pieces.

Advantages of my mass-loaded, spaced-laminated magnetostrictive transducer are: greater efficiency due to efficient use of the magnetostrictive material, lower operating frequency without excessive length, greater operating displacement amplitude, better cooling of the spaced laminations, and essentially simple construction. Also, rigidity is better, the end mass is supported by active material over the full area of the end piece, and a large lateral area of contact of spacer to magnetostrictive lamination provides much better fastening than would be the case if the end piece was simply fastened to the end of the leg.

The foregoing is a description of an illustrative embodiment of the invention, and it is applicant's intention in the appended claims to cover all forms which fall within the scope of the invention.

1. A mass loaded magnetostrictive transducer comprising:
   a plurality of flat strips of magnetostrictive material having a plurality of longitudinal slots extending part way along the length of each strip to form said strip into magnetostrictive legs;
   a first and a second weighted mass, each having slots spaced from each other in one side whereby said flat strips may be fastened into said slots and as said strips expand and contract said masses may be moved;
   means for fastening opposite ends of said magnetostrictive means to said first and second weighted mass in said slots along said body means; and
   conductor means wrapped about each said leg and connected in series whereby when pulsating current is passed through said coils, the length of each said elongate magnetostrictive means and said transducer is changed by each variation of current and the flux polarity in adjacent legs is opposed and a closed flux path is established through adjacent legs.

2. A mass-loaded magnetostrictive transducer as set forth in claim 1 in which said first and second weighted mass each comprises:
   a plurality of flat oblong elements having greater mass than said plurality of flat strips,
   said flat oblong elements being each attached to at least one side of a flat strip of magnetostrictive material whereby said oblong elements form slots between them and the flat strips of magnetostrictive material fit into these slots and are fastened to said flat oblong elements.

3. A mass loaded magnetostrictive transducer as set forth in claim 1 in which:
   said slots are spaced from each other a distance greater than the thickness of the smallest dimension of the strips.